United States Patent
Urmanov et al.

(10) Patent No.: US 10,163,034 B2
(45) Date of Patent: Dec. 25, 2018

(54) TRIPOINT ARBITRATION FOR ENTITY CLASSIFICATION

(71) Applicant: ORACLE INTERNATIONAL CORPORATION, Redwood Shores, CA (US)

(72) Inventors: Aleksey Urmanov, San Diego, CA (US); Anton Bougaev, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1047 days.

(21) Appl. No.: 13/969,771

(22) Filed: Aug. 19, 2013

(65) Prior Publication Data

US 2014/0379717 A1  Dec. 25, 2014

Related U.S. Application Data

(60) Provisional application No. 61/836,812, filed on Jun. 19, 2013.

(51) Int. Cl.
| | | |
|---|---|---|
| G06F 17/30 | (2006.01) | |
| G06F 7/00 | (2006.01) | |
| G06K 9/62 | (2006.01) | |

(52) U.S. Cl.
CPC ......... G06K 9/6215 (2013.01); G06K 9/6271 (2013.01)

(58) Field of Classification Search
None
See application file for complete search history.

(56) References Cited

U.S. PATENT DOCUMENTS

| | | |
|---|---|---|
| 5,987,399 A | 11/1999 | Wegerich et al. |
| 6,208,997 B1 | 3/2001 | Sigeti et al. |
| 7,660,775 B2 | 2/2010 | Bougaev et al. |

(Continued)

FOREIGN PATENT DOCUMENTS

WO  WO-9957686 A1  11/1999

OTHER PUBLICATIONS

Yang Zhou; Graph Clustering Based on Structural/Attribute Similarities; 2009; VLDB; ACM; pp. 718-729.*

(Continued)

*Primary Examiner* — Mariela Reyes
*Assistant Examiner* — Jermaine A Mincey
(74) *Attorney, Agent, or Firm* — Kraguljac Law Group, LLC (57) ABSTRACT

Systems, methods, and other embodiments associated with tripoint arbitration for data classification are described. In one embodiment, a method includes receiving a query data point for classification, an arbiter point, a first set of classified data points belonging to a first class and a second set of classified data points belonging to a second class. A class-aggregated similarity metric for the query data point and each set is determined based, at least in part, on tripoint arbitration coefficients for data point pairs that include the query data point and a classified data point in the set, as calculated using the arbiter point. The query data point is classified based on a comparison of the similarity metric determined for the first set and the similarity metric determined for the second set.

20 Claims, 8 Drawing Sheets

(56) References Cited

U.S. PATENT DOCUMENTS

| | | | |
|---|---|---|---|
| 7,761,350 B1* | 7/2010 | Ridgeway | G06Q 30/0639 701/533 |
| 8,533,027 B1* | 9/2013 | Wakely | G06Q 40/08 705/7.28 |
| 9,147,167 B2 | 9/2015 | Urmanov et al. | |
| 9,514,213 B2 | 12/2016 | Wood et al. | |
| 2002/0147703 A1* | 10/2002 | Yu | G06F 17/30327 |
| 2003/0224344 A1 | 12/2003 | Shamir | |
| 2006/0161592 A1 | 7/2006 | Ertoz | |
| 2008/0010304 A1 | 1/2008 | Vempala | |
| 2008/0181503 A1 | 7/2008 | Schclar | |
| 2008/0275862 A1 | 11/2008 | Liu | |
| 2012/0254183 A1 | 10/2012 | Ailon | |
| 2013/0271463 A1* | 10/2013 | Curington | G06T 9/001 345/420 |
| 2014/0143182 A1 | 5/2014 | Urmanov et al. | |
| 2014/0280146 A1 | 9/2014 | Wood et al. | |

OTHER PUBLICATIONS

Hale Erten; Triangulations with Locally Optimal Steiner Points; 2007; Eurographics Symposium on Geometry Processing; pp. 1-10.*

B.A. Lewis; Triangulation of planar regions with applications; 1976; The Computer Journal; pp. 324-332.*

U.S. Patent and Trademark Non-Final Office Action in co-pending U.S. Appl. No. 14/251,867, filed Apr. 14, 2014; dated Dec. 2, 2016.

B. A. Lewis, "Triangulation of Planar Regions with Applications", 1976, The Computer Journal; pp. 324-332, downloaded on Dec. 2, 2016 from: http://r.search.yahoo.com/_ylt=AwrBT4eqw0FYalAAhGlXNyoA;_ylu=X3oDMTEyMmM1aDZ2BGNvbG8DYmYxBH BvcwMxBHZ0aWQDQjMxNjZfMQRzZWMDc3I-/RV=2/RE=1480733738/RO=10/RU=http%3a%2f%2fcomjnl.oxfordjournals.org%2fcontent%2f21%2f4%2f324.full.pdf/RK=0/RS=uipbGbnpd.0yF3vmUyyjg1rolLo-.

Hale Erten et al., "Triangulations with Locally Optimal Steiner Points", Eurographics Symposium on Geometry Processing, 2007—pp. 1-10.

Yang Zhou et al., "Graph Clustering Based on Structural/Attribute Similarities", pp. 1-12, downloaded on Sep. 9, 2016 from: cgi-serv.se.cuhk.edu.hk/~hcheng/paper/vldb09-175.pdf.

U.S. Patent and Trademark Final Office Action in co-pending U.S. Appl. No. 14/251,867, filed Apr. 14, 2014; dated Aug. 15, 2017.

U.S. Patent and Trademark Non-Final Office Action in co-pending U.S. Appl. No. 14/669,729, filed Mar. 26, 2015; dated Jun. 30, 2017.

U.S. Patent and Trademark Final Office Action in co-pending U.S. Appl. No. 14/669,729, filed Mar. 26, 2015; dated Nov. 2, 2017.

U.S. Patent and Trademark Non-Final Office Action in co-pending U.S. Appl. No. 14/669,792, filed Mar. 26, 2015; dated Nov. 3, 2017.

A Probabilistic Framework for Graph Clustering, Luo et al., IEEE, pp. I-912-I-919, 2001.

Hu, et al.; Pairwise Constrained Clustering with Group Similarity-Based Patterns, Ninth International Conference on Machine Learning and Applications, pp. 260-265, 2010.

U.S. Patent and Trademark Final Office Action in co-pending U.S. Appl. No. 14/669,729, filed Mar. 26, 2015; dated May 9, 2018.

U.S. Patent and Trademark Final Office Action in co-pending U.S. Appl. No. 14/669,792, filed Mar. 26, 2015, dated Apr. 18, 2018.

Heinrich, et al., Multi-Distance Motion Vector Clustering Algorithm for Video-Based Sleep Analysis, 15th Intl. Conference on e-Health Networking, Applications and Services (Healthcom 2013) (Year: 2013) pp. 223-227.

* cited by examiner

TRIPOINT ARBITRATION FOR ENTITY CLASSIFICATION

CROSS REFERENCE TO RELATED APPLICATIONS

This disclosure claims the benefit of U.S. Provisional Patent Application Ser. No. "61/836,812" filed Jun. 19, 2013, titled "Self Reliant Observers for Tri-Point Arbitration Entity Labeling System", inventors: Urmanov and Bougaev, and assigned to the present assignee, which is incorporated herein in its entirety.

BACKGROUND

Classification of previously unclassified entities is performed in a wide range of environments including retailing, engineering, health sciences, and social media. For example, data about a given shopper may be used to classify a shopper as either being likely to respond to a certain type of advertisement or not likely to respond to that type of advertisement. This classification of the shopper may be used to tailor ads that are presented to the shopper. Data about a given patient may be used to classify the patient based on susceptibility to various diseases. Thus, the patient may be classified as high risk for lung cancer if the patient is a smoker. Data mining and machine learning are used to classify entities by leveraging accumulated structured and unstructured data. Classification techniques seek to balance between computational intensity and accuracy.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

At a basic level, classification of an unclassified entity involves identifying a set of already classified entities to which the entity is most similar. A building block of traditional similarity analysis in machine learning and data mining is categorizing data and their attributes into known and well-defined domains and identifying appropriate relations for handling the data and their attributes. For example, similarity analysis includes specifying equivalence, similarity, partial order relations, and so on. In trivial cases when all attributes are numeric and represented by real numbers, comparing data point attributes is done by using the standard less-than, less-than-or-equal, more-than, and more-than-or-equal relations, and comparing points by computing distances (e.g., Euclidean) between the two points. In this case, the distance between two data points serves as the measure of similarity between the data points. If the distance is small, the points are deemed similar. If the distance is large, the points are deemed dissimilar.

A matrix of pair-wise distances between all data points in a data set is a standard similarity metric that is input to a variety of data mining and machine learning tools for clustering, classification, pattern recognition, and information retrieval. Euclidean distance is one possible distance between data points for use in the pair-wise matrix. A variety of other distance-based measures may be used depending on the specific domain of the data set. However, the distance based measures used in traditional machine learning are understandably all based on two data points.

One of the deficiencies of the traditional two data point distance approach to similarity analysis is the subjectivity that is introduced into the analysis by an outside analyst. An outside analyst determines the threshold on distances that indicate similarity. This leads to non-unique outcomes which depend on the analyst's subjectivity in threshold selection.

Traditionally, a determination as to what constitutes "similarity" between data points in a data set is made by an analyst outside the data set. For example, a doctor searching for patients in a data set having "similar" age to a given patient specifies an age range in her query that, in her opinion, will retrieve patients with a similar age. However, the age range that actually represents "similar" ages depends upon the data set itself. If the data set contains patients that are all very similar in age to the given patient, the query may be over-selective, returning too many patients to effectively analyze. If the data set contains patients that have ages that have a wide variety of ages, the query may be under-selective, missing the most similar patients in the data set.

Another deficiency in the traditional two point distance approach to similarity analysis is the conceptual difficulty of combining attributes of different types into an overall similarity of objects. The patient age example refers to a data point with a single, numerical, attribute. Most machine learning is performed on data points that have hundreds of attributes, with possibly non-numerical values. Note that the analyst will introduce their own bias in each dimension, possibly missing data points that are actually similar to a target data point. Some pairs of points may be close in distance for a subset of attributes of one type and far apart in distance for another subset of attribute types. Thus, the analyst may miss data points that are similar to the target data point for reasons that are as yet unappreciated by the analyst. Proper selection of the similarity metric is fundamental to the performance of clustering, classification and pattern recognition methods used to make inferences about a data set.

Systems and methods are described herein that provide classification based on similarity analysis performed using tripoint arbitration. Rather than determining similarity of a query point to a set of classified data points based on the opinion of an external analyst, tripoint arbitration determiners similarity with an unbiased arbiter point. Thus, rather than expressing similarity based on distances between two points and forcing the analyst to determine a range of distances that is similar, the systems and methods herein use three points to determine similarity, thereby replacing the external analyst with an unbiased arbiter point, i.e., introducing an internal analyst into similarity determination.

Tripoint arbitration is realized through the introduction of an arbiter point into the process of evaluation of two or more data points for processing attributes and attribute combinations allowing for inference about possible relationships between the data points. The term "data point" is used in the most generic sense and can represent points in a multidimensional metric space, images, sound and video streams, free texts, genome sequences, collections of structured or unstructured data of various types. The disclosed tripoint arbitration techniques uncover the intrinsic structure in a group of data points, facilitating inferences about the interrelationships among data points in a given data set or population. The disclosed tripoint arbitration techniques have extensive application in the fields of data mining, machine learning, and related fields that in the past have relied on two point distance based similarity metrics.

Figure 1:
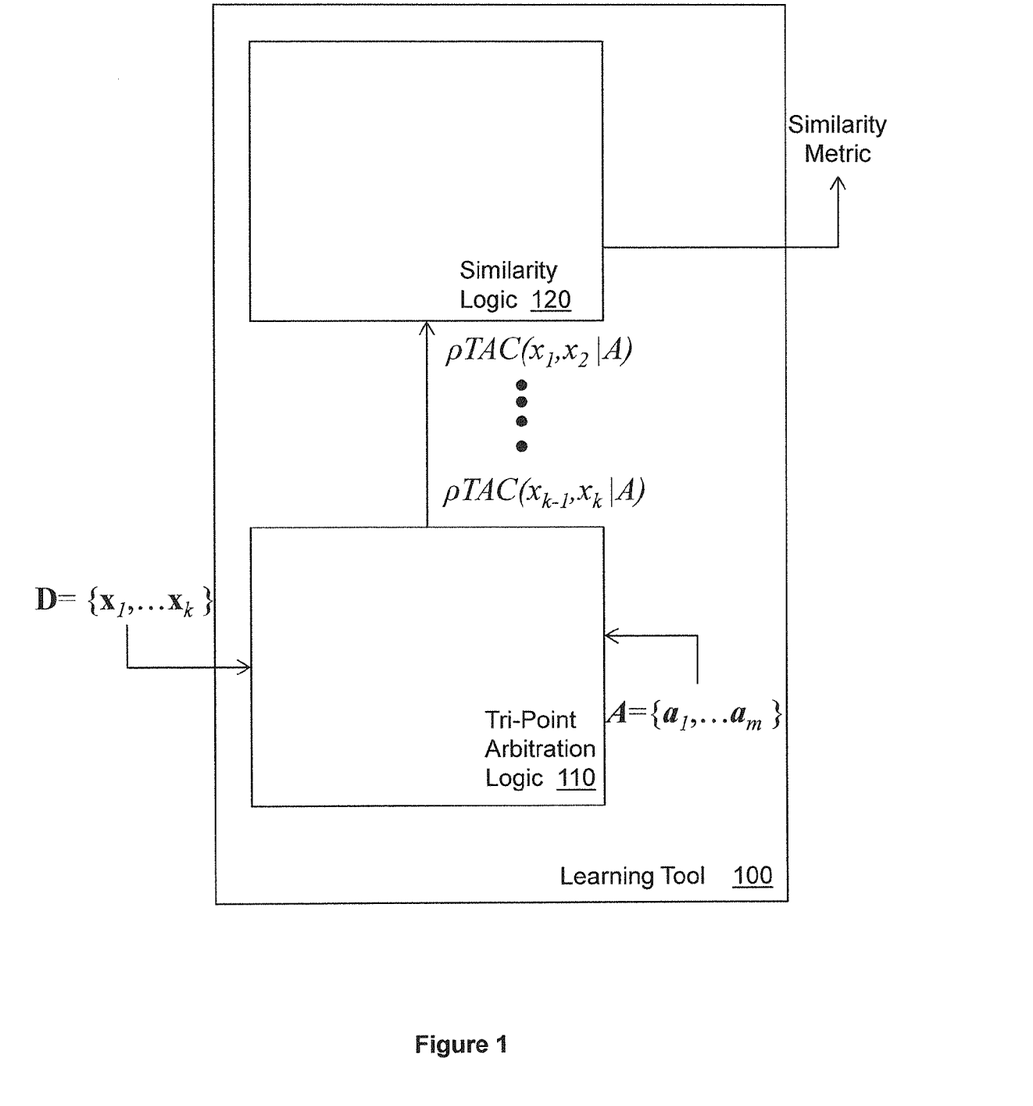
FIG. 1 illustrates an embodiment of a system associated with similarity analysis with tripoint data arbitration.

With reference to FIG. 1, one embodiment of a learning tool 100 that performs similarity analysis using tripoint arbitration is illustrated. The learning tool 100 inputs a data set D of data points $\{x_1, \ldots, x_k\}$ and calculates a similarity metric using tripoint arbitration. The learning tool 100 includes a tripoint arbitration logic 110 and a similarity logic 120. The tripoint arbitration logic 110 selects a data point pair $(x_1, x_2)$ from the data set. The tripoint arbitration logic 110 also selects an arbiter point $(a_1)$ from a set of arbiter points, A. Various examples of sets of arbiter points will be described in more detail below.

The tripoint arbitration logic 110 calculates a tripoint arbitration coefficient for the data point pair based, at least in part, on a distance between the first and second data points and the selected arbiter point $a_1$. The tripoint arbitration logic 110 calculates additional respective tripoint arbitration coefficients for the data point pair $(x_1, x_2)$ based on respective arbiter points $(a_2-a_m)$. The tripoint arbitration coefficients for the data pair are combined in a selected manner to create an aggregate tripoint arbitration coefficient for the data pair. The aggregate tripoint arbitration coefficient for the data point pair, denoted $\rho TAC(x_1, x_2|A)$, is provided to the similarity logic 120. The tripoint arbitration logic 110 computes aggregate tripoint arbitration coefficients for the other data point pairs in the data set and also provides those tripoint arbitration coefficients to the similarity logic 120.

Figure 2:
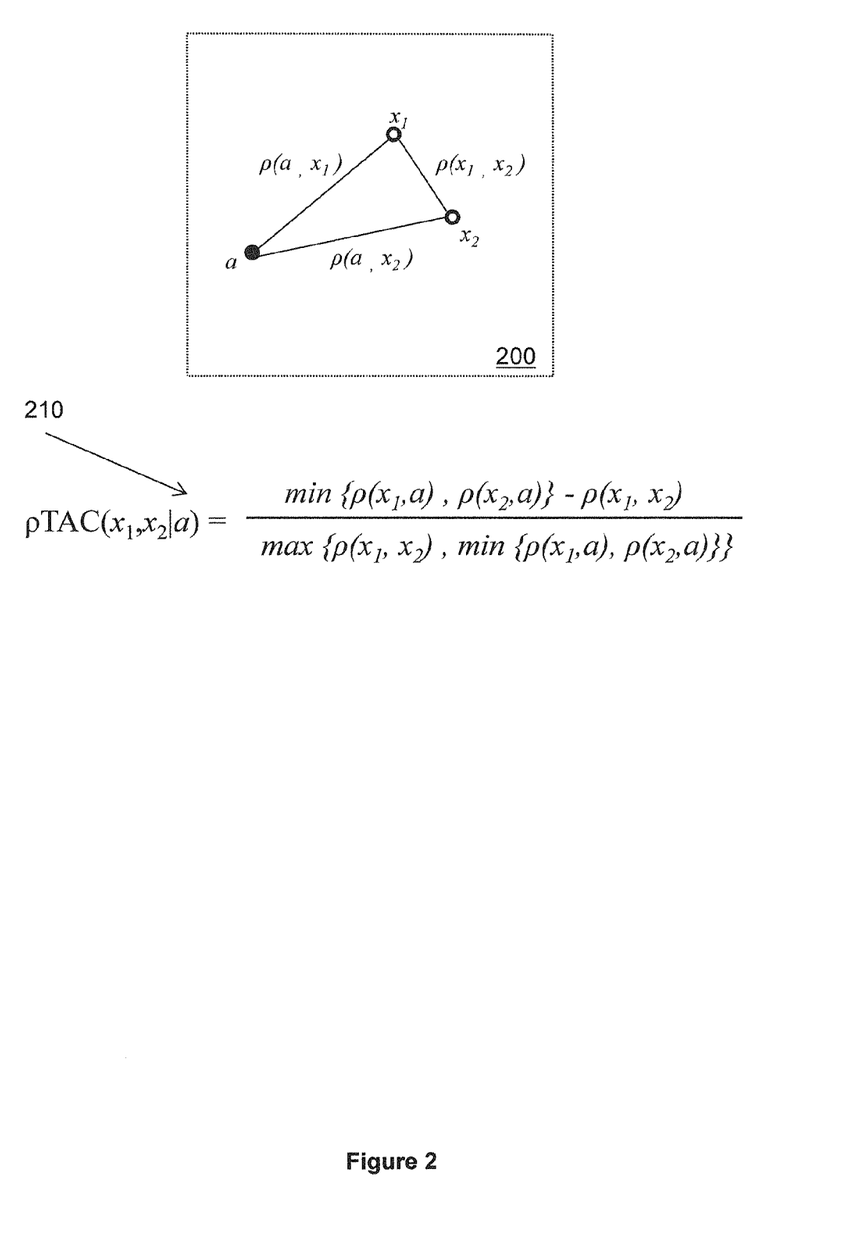
FIG. 2 illustrates a graphical example of embodiment of tripoint data arbitration.

FIG. 2 illustrates one embodiment of a tripoint arbitration technique that may be used by the tripoint arbitration logic 110 to compute the tripoint arbitration coefficient. A plot 200 illustrates a spatial relationship between the data points in the data point pair $(x_1, x_2)$ and an arbiter point a. Recall that the data points and arbiter point will typically have many more dimensions than the two shown in the simple example plot 200. The data points and arbiter points may be points or sets in multi-dimensional metric spaces, time series, or other collections of temporal nature, free text descriptions, and various transformations of these. A tripoint arbitration coefficient for data points $(x_1, x_2)$ with respect to arbiter point a is calculated as shown in 210, where $\rho$ designates a two-point distance determined according to any appropriate technique:

$$\rho TAC(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}}$$

Thus, the tripoint arbitration technique illustrated in FIG. 2 calculates the tripoint arbitration coefficient based on a first distance between the first and second data points, a second distance between the arbiter point and the first data point, and a third distance between the arbiter point and the second data point.

Values for the tripoint arbitration coefficient for a single arbiter point, $\rho TAC(x_1, x_2|a)$, range from −1 to 1. In terms of similarities, $\rho TAC(x_1, x_2|a) > 0$ when both distances from the arbiter to either data point are greater than the distance between the data points. In this situation, the data points are closer to each other than to the arbiter. Thus a positive tripoint arbitration coefficient indicates similarity, and the magnitude of the positive coefficient indicates a level of similarity. $\rho TAC(x_1, x_2|a) = +1$ indicates a highest level of similarity, where the two data points are coincident with one another.

In terms of dissimilarity, $\rho TAC(x_1, x_2|a) < 0$ results when the distance between the arbiter and one of the data points is less than the distance between the data points. In this situation, the arbiter is closer to one of the data points than the data points are to each other. Thus a negative tripoint arbitration coefficient indicates dissimilarity, and the magnitude of the negative coefficient indicates a level of dissimilarity. $\rho TAC(x_1, x_2|a) = -1$ indicates a complete dissimilarity between the data points, when the arbiter coincides with one of the data points.

A tripoint arbitration coefficient equal to zero results when the arbiter and data points are equidistant from one another. Thus $\rho TAC(x_1, x_2|a) = 0$ designates complete indifference with respect to the arbiter point, meaning that the arbiter point cannot determine whether the points in the data point pair are similar or dissimilar.

Returning to FIG. 1, the similarity logic 120 determines a similarity metric for the data set based, at least in part, on the aggregate tripoint arbitration coefficients for the data point pairs. In one embodiment, the similarity metric is a pair-wise matrix, $M_{TAC}$, of tripoint arbitration coefficients using the empirical formulation:

$$M_{TAC} = \begin{matrix} \rho ETAC(x_1, x_1 \mid D) & \ldots & \rho ETAC(x_1, x_k \mid D) \\ \rho ETAC(x_2, x_1 \mid D) & \ldots & \rho ETAC(x_2, x_k \mid D) \\ & \ldots & \\ \rho ETAC(x_k, x_1 \mid D) & \ldots & \rho ETAC(x_k, x_k \mid D) \end{matrix}$$

The illustrated pair-wise $M_{TAC}$ matrix arranges the aggregate tripoint arbitration coefficient for the data points in rows and columns where rows have a common first data point and columns have a common second data point. When searching for data points that are similar to a target data point within the data set, either the row or column for the target data point will contain tripoint arbitration coefficients for the other data points with respect to the target data point. High positive coefficients in either the target data point's row or column may be identified to determine the most similar data points to the target data point. Further, the pair-wise $M_{TAC}$ matrix can be used for any number of learning applications, including clustering and classification based on the traditional matrix of pair-wise distances. The matrix may also be used as the proxy for similarity/dissimilarity of the pairs.

As already discussed above, the arbitration point(s) represent the data set rather than an external analyst. There are several ways in which a set of arbitration points may be selected. The set of arbitration points A may represent the data set based on an empirical observation of the data set. For example, the set of arbitration points may include all points in the data set. The set of arbitration points may include selected data points that are weighted when combined to reflect a contribution of the data point to the overall data set. The aggregate tripoint arbitration coefficient calculated based on a set of arbitration points that are an empirical representation of the data set (denoted $\rho ETAC(x_1, x_2|A)$) may be calculated as follows:

$$\rho ETAC(x_1, x_2 \mid A) = \frac{1}{m}\sum_{i=1}^{m} \rho TAC(x_1, x_2 \mid a_i)$$

Variations of aggregation of arbitration points including various weighting schemes may be used. Other examples of aggregation may include majority/minority voting, computing median, and so on.

For a known or estimated probability distribution of data points in the data set, the set of arbitration points corresponds to the probability distribution, f(a). The aggregate tripoint arbitration coefficient calculated based on the probability distribution (denoted $\rho PTAC$) may be calculated as follows:

$$\rho PTAC(x_1, x_2 \mid f(a)) = \int_{a_{lo}}^{a_{hi}} \rho TAC(x_1, x_2 \mid a) f(a) \, da$$

Thus, the tripoint arbitration coefficient can be calculated using an empirical observation of the data point values in the data set, an estimated distribution of the data point values in the data set or an actual distribution of data point values in the data set.

Figure 3:
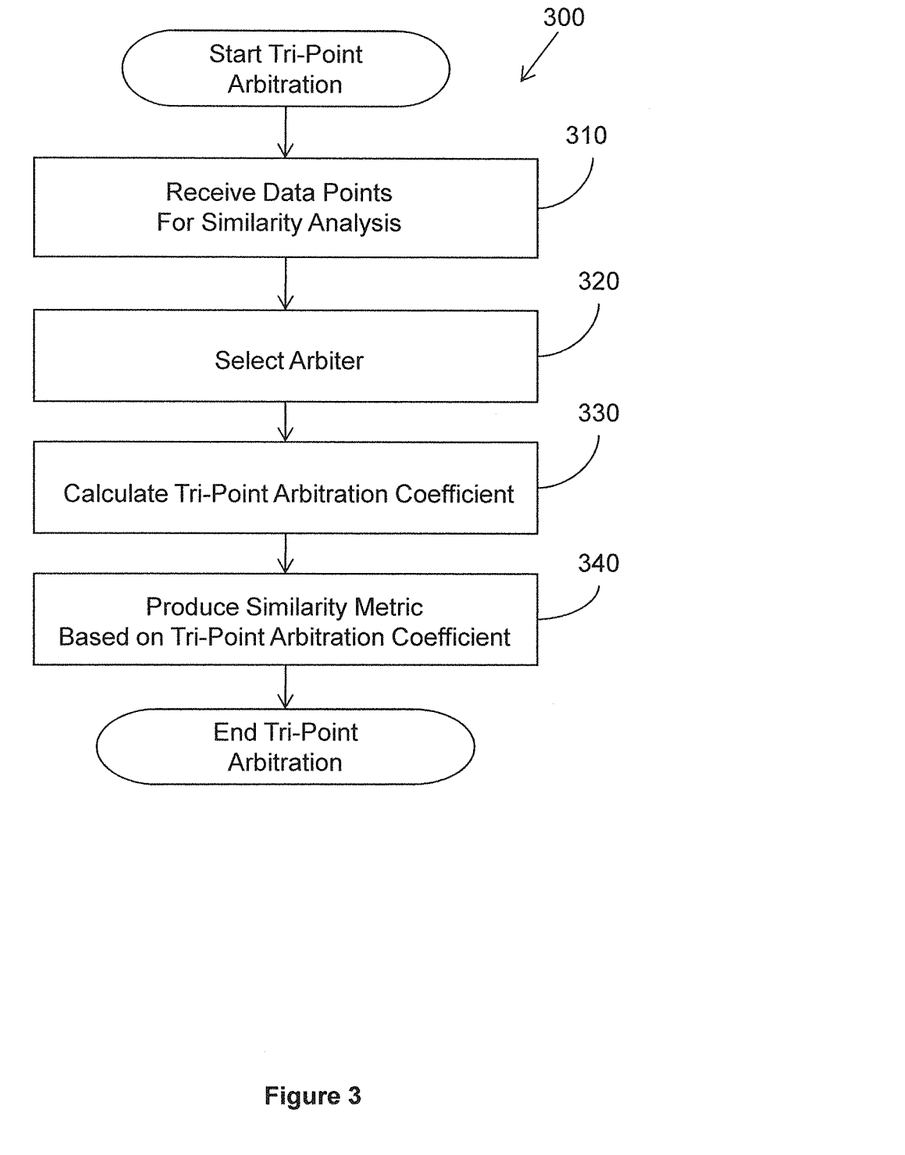
FIG. 3 illustrates an embodiment of a method associated with similarity analysis with tripoint data arbitration.

FIG. 3 illustrates one embodiment of a method 300 for performing tripoint arbitration to determine similarity between data points. The method includes, at 310, selecting a data point pair including a first data point and a second data point from the data set. The method includes, at 320, selecting an arbiter point. At 330, the method includes calculating a tripoint arbitration coefficient for the data point pair based, at least in part, on a distance between the first and second data points and the arbiter point. The method includes, at 340, producing a similarity metric for the data set based, at least in part, on the tripoint arbitration coefficients for data point pairs in the set of data points calculated using the selected arbiter point. As discussed above, if a plurality of arbiter points is used, the tripoint arbitration coefficients for a given data point pair may be aggregated for the plurality of arbiters.

Tripoint Arbitration for Classification

Figure 4:
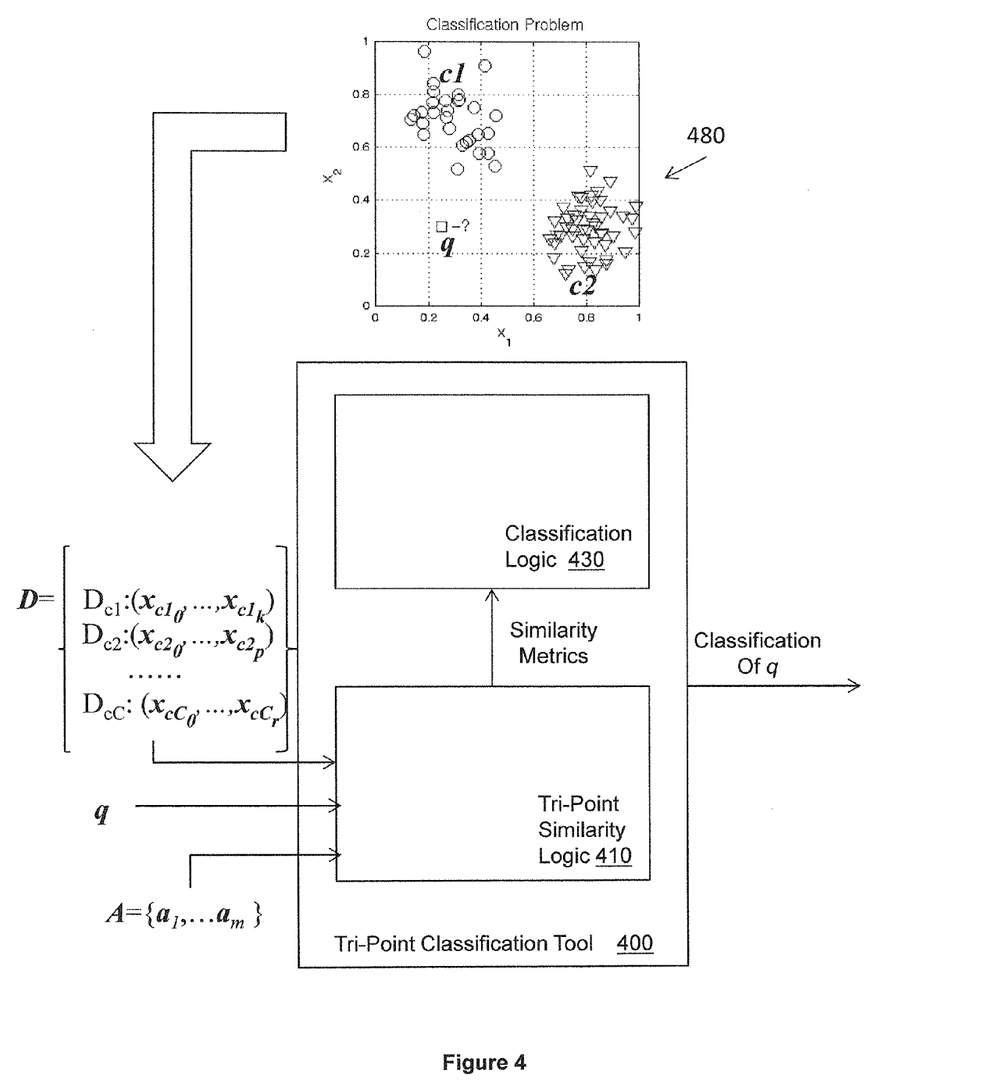
FIG. 4 illustrates an embodiment of a system associated with classification using tripoint data arbitration.

The similarity analysis based on tripoint arbitration just described can be applied in the field of data classification. FIG. 4 illustrates one embodiment of a tripoint classification tool 400 that performs classification using tripoint arbitration to determine similarity between a query data point q and already classified data points in D. A graphical representation of a simple two dimensional classification operation being performed by the tool 400 is shown as scatter graph 480. Scatter graph 480 illustrates two classes of data points: a first class c1 denoted by circles and a second class c2 denoted by triangles. A query data point q is shown as a square. Typically data available are generated by some unknown data generating mechanism. In this case the design data were generated using two two-dimensional Gaussian distributions with different mean vectors. The classification being performed by the tripoint classification tool 400 is to determine to which class the query data point q (the square) belongs to.

For example, a user base can be split, based on historical data for responses to a certain type of advertisement, into two classes: "responders", in class 1 and "no-responders", in class 2. This historical data, or design set, is designated as D in FIG. 4. D includes a first set of data points $(x_{c10}, \ldots, x_{c1k})$ that belong to class 1 "responders" and a second set of data points $(x_{c20}, \ldots, x_{c2p})$ that belong to class 2 "no-responders". In FIG. 4, additional sets of data points for classes through class C are shown as belonging to set D for the sake of generality to illustrate that more than two classes may be used. Only classes 1 and 2 will be used for the purposes of this illustration.

A new user, having patterns of activity (e.g., attribute values such as sex, age, and income) corresponding to data point q, visits a website. The tripoint classification tool 400 uses tripoint arbitration to classify the new user as belonging either to class 1 (responder) or class 2 (no-responder). The website uses this classification of the new user to select an ad flashing policy that has been shown to be effective for other users in the classification.

Design set D, query data point q, and a set of arbiters A are input to a tripoint similarity logic 410 that performs tripoint arbitration to produce a set of similarity metrics, one similarity metric for each possible class. Using tripoint arbitration, each arbiter in A is used to determine the similarity of the query data point to classified data points. Recall that the formula for tripoint arbitration for determining a tripoint arbitration coefficient for a pair of data points that includes the query data point q and a classified data point x with respect to an arbiter a is:

$$\rho TAC(q, x \mid a) = \frac{\min\{\rho(q, a), \rho(x, a)\} - \rho(q, x)}{\max\{\rho(q, x), \min\{\rho(q, a), \rho(x, a)\}\}}$$

For each arbiter a, the tripoint arbitration coefficient for the query data point and classified data points in each class are aggregated according to some class aggregation rule to produce a class-aggregated similarity metric for the query point and each class. Thus, the tripoint arbitration coefficients for the query data point and the data points in class 1 are aggregated to compute a first class-aggregated similarity metric. The tripoint arbitration coefficients for the query data point and the data points in class 2 are aggregated to compute a second class-aggregated similarity metric. Using an averaging class aggregation technique, for a single arbiter a, the class-aggregated similarity for the query point q with respect to class 1 (which has k members) may be expressed as:

$$CASim(q, x_{c1} \mid a) = \frac{1}{k}\sum_{i=0}^{k} \rho TAC(q, x_{c1i} \mid a)$$

If a single arbiter is used, the class-aggregated similarity metric for each class is provided to the classification logic 430. The classification logic 430 assigns a classification to the query data point q based on the class-aggregated similarity metrics. In one embodiment, the classification logic classifies the query data point q as belonging to the class having the highest class-aggregated similarity metric:

$$Class(q)=C_{arg\ max_c CASim(q,x_c|a)}$$

In many instances, a plurality of arbiter points will be used to classify the query data point. When more than one arbiter point is used, the class-aggregated similarities are further aggregated over all arbiters using an arbiter aggregation rule to produce an arbiter-class-aggregated similarity for the query point and each class, which for class 1 and m arbiters using an averaging aggregation technique would be:

$$Sim(q, x_{c1} \mid A) = \frac{1}{m}\sum_{i=1}^{m} CASim(q, x_{c1} \mid a_i)$$

The query entity is assigned a classification based on a comparison of the arbiter-class-aggregated similarities. In one embodiment, the classification logic 430 classifies the query data point q as belonging to the class having the highest arbiter-class-aggregated similarity metric:

$$Class(q)=C_{arg\ max_c Sim(q,x_c|A)}$$

Figure 5:
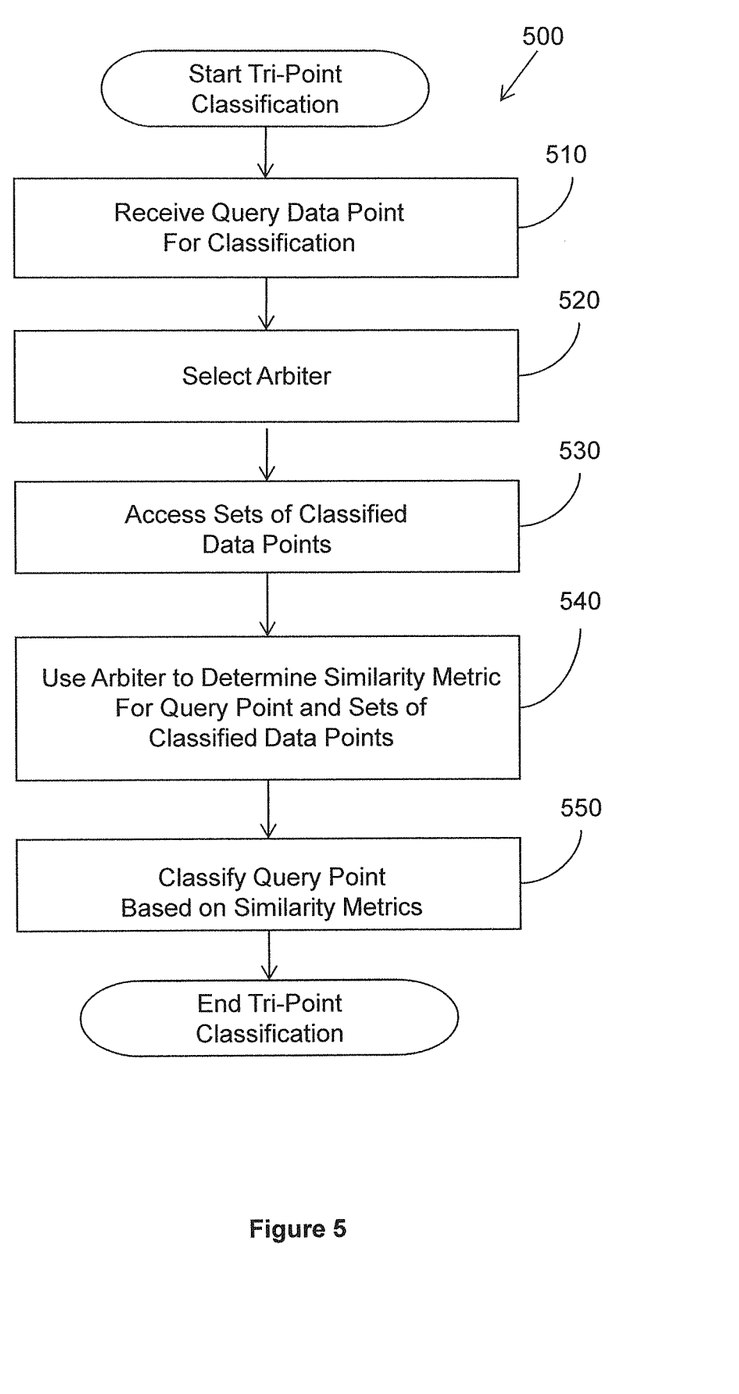
FIG. 5 illustrates an embodiment of a method associated with classification using tripoint data arbitration.

FIG. 5 illustrates one embodiment of a method 500 that performs classification using tripoint arbitration. The method includes, at 510 receiving a query data point q for classification. The method includes, at 520, selecting an arbiter point a to perform classification of the data point q. For the sake of simplicity, a single arbiter point is used in the method outlined in FIG. 5, however, as discussed above with respect to FIG. 4, multiple arbiter points may be used. At 530 a first set of classified data points belonging to a first class and a second set of classified data points belonging to a second class are accessed (e.g., design set of classified data points D in FIG. 4).

At 540, a class-aggregated similarity (CASim) for the query data point with respect to each of the first set and second set is determined. For each set, for one or more data points in the set, a classified data point $x_c$ is selected from the set to form a data point pair $(q, x_c)$. A tripoint arbitration coefficient is calculated for the data point pair based, at least in part, on a distance between the query data point q, the classified data point $x_c$ and the arbiter point a. The following formula may be used to determine the tripoint arbitration coefficient $\rho TAC$:

$$\rho TAC(q, x \mid a) = \frac{\min\{\rho(q, a), \rho(x, a)\} - \rho(q, x)}{\max\{\rho(q, x), \min\{\rho(q, a), \rho(x, a)\}\}}$$

The class-aggregated similarity metric is determined for the query data point and the set based, at least in part, on tripoint arbitration coefficients for data point pairs that include the query data point and an unclassified data point in the set, as calculated using the selected arbiter point. The following formula may be used to determine the class-aggregated similarity CASim for a class C using k points classified as belonging to class C:

$$CASim(q, x_C \mid a) = \frac{1}{k}\sum_{i=0}^{k} \rho TAC(q, x_{Ci} \mid a)$$

If multiple arbiters are used, step 540 is repeated for each arbiter and for each class, the class-aggregated similarities for all arbiters is aggregated to calculate an arbiter-class-aggregated similarity. The following formula may be used to calculate the arbiter-class-aggregated similarity for a set of m arbiters:

$$Sim(q, x_{c1} \mid A) = \frac{1}{m}\sum_{i=1}^{m} CASim(q, x_{c1} \mid a_i)$$

At 550, the method includes classifying the query data point based on a comparison of the similarity metric determined for the first set and the similarity metric determined for the second set. In one embodiment, if a single arbiter point is used, the query data point q is classified as belonging to the class having the highest class-aggregated similarity metric:

$$Class(q)=C_{arg\ max_c CASim(q,x_c|a)}$$

In one embodiment, if multiple arbiter points are used, the query data point q is classified as belonging to the class having the highest arbiter-class-aggregated similarity metric:

$$Class(q)=C_{arg\ max_c Sim(q,x_c|A)}$$

In one embodiment, if none of similarity metrics for the existing classes in the design exceeds a threshold, the query point q is classified as being of undetermined class.

Arbiter Selection for Classification

In a simple implementation, a single arbiter point may be used to classify a query point using tripoint arbitration. The sole arbiter point may be one of the points from the design set (D) selected at random or using some optimality criterion. The sole arbiter point may be a point that is not a member of the design set. Example optimality criteria for selecting an optimal sole arbiter include selecting an arbiter point that minimizes cross-class similarity. Use of a sole arbiter point selected randomly results in classification that can be performed very quickly and cheaply on an arbitrary data set with results that in many cases are acceptable for data exploratory analysis.

Many different approaches may be taken in selecting a set of arbiter points for use in classification. Some or all data points in the design set D may be used. Data points outside the design set may also be used as arbiter points. A dedicated set of arbiter points may be specified by experts in the field being analyzed. A set of arbiter points may be selected by splitting the original design set in some optimized manner. Regardless of how arbiter points are selected, the class-aggregated similarities for each class are aggregated over all arbiters to calculate the arbiter-class-aggregated similarity.

One or more unopinionated arbiter points may be used. A set of arbiter points is selected such that each arbiter point in the set is substantially equidistant with respect to the first set and second set. An arbiter point is substantially equidistant with respect to the first set and second set when an aggregated similarity metric determined between the arbiter and data points in the first set is substantially equal to an aggregated similarity metric determined between the arbiter and data points in the second set.

Arbiter points may be selected to maximize in-class similarity subject to cross-class similarity. Arbiter points may be selected to minimize cross-class similarity subject to in-class similarity. One or more data points lying on a predetermined arbiter line segment, or a set of piecewise linear segments, may be selected as arbiter points.

Sets of arbiter points may be specified as lying on a manifold in multidimensional space, for example, a curve, a surface (e.g., plane, sphere, torus). For example, an n-dimensional sphere in the data space can be used as a set of arbiter points. The arbiter sphere can surround all the points in the design set. Another example is a piece of a curve that can host arbiter points and the resulting tripoint arbitration classification classifies query data points based on the aggregation of the curve arbiters. To specify a manifold, a set of arbiter points is selected that lie on a predetermined multidimensional manifold, wherein the manifold is determined such that pairs of data points within the same class are similar with respect to arbiter points in the manifold and pairs of data points that include points from different classes are not similar with respect to points in the manifold. Arbiters may be specified by a probability distribution function, or some weighting function defined on a manifold. Arbiters may be located in a regular or irregular grid in the data space.

The methods and systems described herein perform favorably as compared to existing classification techniques. The field of classification is represented by two branches of approaches: parametric and non-parametric. The parametric methods assume a known parametric form (e.g., functional relationship) between data point attributes and class labels. The parametric form can be instead specified for the so-called separating hyper-surface that separates the data points of claims 1 from data points of class 2 in the data attributes space or in a lower/higher dimensional feature space. Alternatively, the parametric form can be specified for a hypothesized data-generating distribution (typically multivariate Gaussian with different means and covariance matrices for different classes or a mixture of those).

The parametric form specifies the type of relationship between data attributes and the labels, such as linear, quadratic, cubic, or other specific nonlinear relationships and allows a user to vary parameters to better match the selected parametric form to the unknown "true" relationship. The parameters are determined from historical data, termed the design set, that contain classified representatives of each class, selected to optimize a certain optimality criterion. For example, one of the criteria can be minimizing the classification error on the design set represented by a confusion matrix. The confusion matrix represents how many points of class 1 were classified by the classifier as class 2 points and how many points of class 2 were classified as class 1 points. Other optimality criteria include approximations of classification error for the population of data (which is unknown and unavailable). For example, holding off a part of the design set and using it as a test subset to compute the classification error for various vales of the parameters produces an approximation to the population classification error.

Common examples of parametric classifiers are linear, quadratic, and other discriminant function-based classifiers and their piecewise versions, Gaussian and Gaussian mixture classifiers, naïve Bayes, and so on. As an example, Gaussian classifiers assume that different classes generate data based on different multivariate Gaussian distributions and, therefore, the classifier training process estimates the parameters of a Gaussian distribution for each class using maximum likelihood parameter estimation or maximum a posteriori parameter estimation.

Since the parametric form strictly determines the relationship type, all parametric classifiers are limited to the data sets that fit the parametric assumptions of the relationship. This approach might be unsuitable for exploratory data analysis and mining of Big Data in which no parametric assumptions on the data generating mechanism can be made or justified. For example, quadratic classifiers will have a large classification error for non-Gaussian data.

Figure 6:
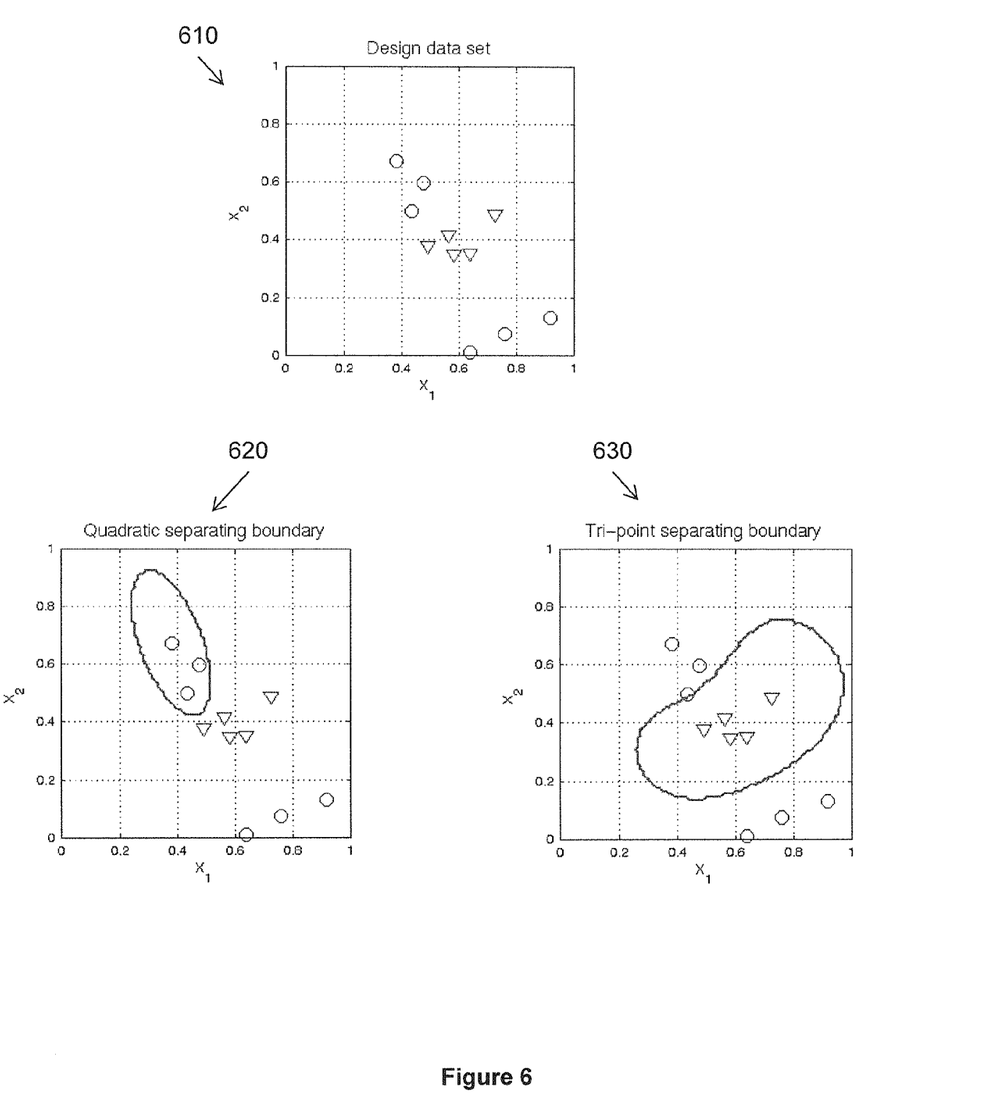
FIG. 6 illustrates a comparison of classification performance as between classification using tripoint arbitration and classification using a quadratic classifier.

FIG. 6 illustrates how classification using tripoint arbitration performs as compared to a quadratic classifier on non-Gaussian data. A non-Gaussian design data set in graph 610 is classified into circles and triangles. Because parametric assumptions of the quadratic classifier do not hold for this design data set, the quadratic classifier fails to separate the circle class from the triangle class as shown in graph 620. Classification using tripoint arbitration successfully separates the design data into two classes as seen in graph 630.

Common examples of non-parametric classifiers are K-nearest neighbor, Parzen and other Kernel Density Estimator-based classifiers, Learning Vector Quantization (LVQ), Artificial Neural Networks (ANN), Radial Basis Function (RBF) classifiers, Classification and Decision tress, Support Vector machines and other margin-based-learning classifiers.

As an example, the nearest neighbor classifier assigns an unclassified point (X) the label for the point closest to X. Another example is LVQ in which the classifier is expressed in terms of prototype vectors in the data or feature space. The prototypes are learned by classifying the data in the design set by closest prototype and adapting the location of the prototypes to correctly classify the design data points.

Although non-parametric models may allow more flexible fit into the data and are less dependent on the data generating mechanism assumptions, these techniques are prone to over-fitting the data and tend to be computationally expensive. The density-estimation based techniques perform poorly for high-dimensional data as the data tend to be sparse with increasing dimension and no reliable density estimation is possible. Non-density based non-parametric techniques such as maximum margin classifiers typically require parameter selection and are very sensitive performance-wise to the proper selection of various parameters, including the so-called regularization parameters that help reduce overfitting the data.

Figure 7:
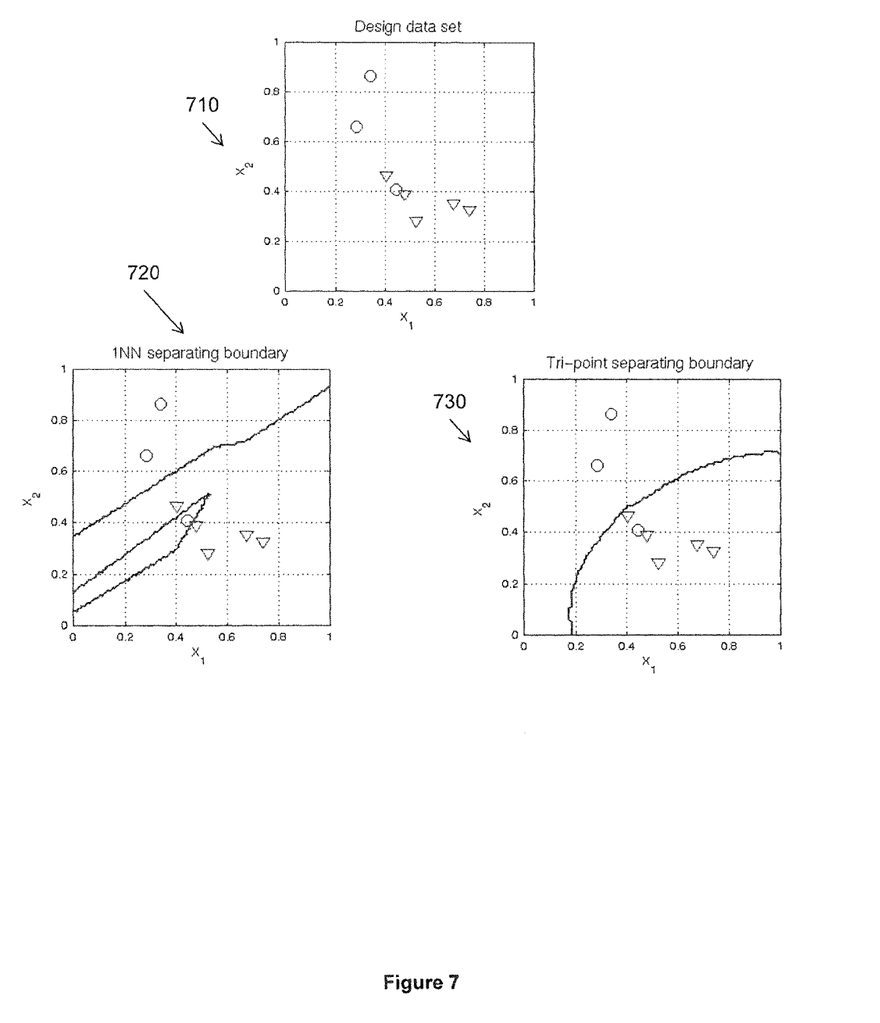
FIG. 7 illustrates a comparison of classification performance as between classification using tripoint arbitration and classification using nearest neighbor.

FIG. 7 illustrates how classification using tripoint arbitration performs as compared to a nearest neighbor classifier on overlapping (linear non-separable) data classes. A design data set is shown in graph 710 that classifies data as either circle or triangle. The nearest neighbor classifier classifies all of the design set correctly as shown in graph 720, which results in significant overfitting. The tripoint arbitration classification technique shown in graph 730 does not over fit the data.

As can be seen from the foregoing description classification using tripoint arbitration does not rely on user-tuning parameters or assumptions about data generating mechanisms. Classification using tripoint arbitration provides a non-trivial way for truly non-parametric classification that does not tend to overfit data. No functional structure is imposed on the relationships that separate data classes. The introduction of the unbiased arbiter into the classification framework allows for a departure from parameter-tuning approaches.

Computer Embodiment

Figure 8:
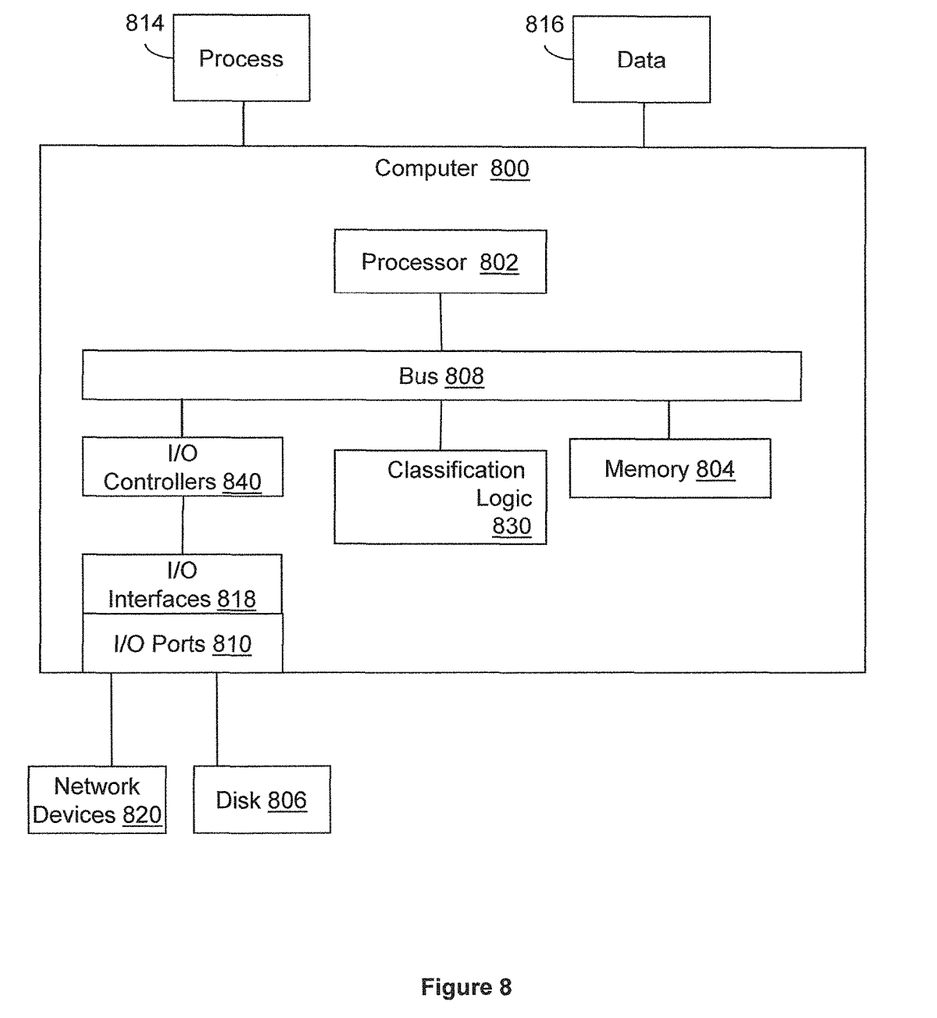
FIG. 8 illustrates an embodiment of a computing system in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a classification logic 830 configured to facilitate classification using tripoint arbitration in a manner similar to that described for the tripoint classification tool 400. In different examples, the classification logic 830 may be implemented in hardware, a non-transitory computer-readable medium with stored instructions, firmware, and/or combinations thereof. While the logic 830 is illustrated as a hardware component attached to the bus 808, it is to be appreciated that in one example, the classification logic 830 could be implemented in the processor 802.

In one embodiment, classification logic 830 is a means (e.g., hardware, non-transitory computer-readable medium, firmware) for performing classification using tripoint arbitration.

The means may be implemented, for example, as an ASIC programmed to perform classification using tripoint arbitration. The means may also be implemented as stored computer executable instructions that are presented to computer 800 as data 816 that are temporarily stored in memory 804 and then executed by processor 802.

Classification logic 830 may also provide means (e.g., hardware, non-transitory computer-readable medium that stores executable instructions, firmware) for performing the methods illustrated in FIGS. 4 and 5.

Generally describing an example configuration of the computer 800, the processor 802 may be a variety of various processors including dual microprocessor and other multiprocessor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods outlined with respect to FIGS. 3 and 5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
USB: universal serial bus.
WAN: wide area network.

"Computer-readable medium", as used herein, is a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. Computer-readable medium described herein are limited to statutory subject matter under 35 U.S.C § 101.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to:
receive a query data point q for classification, wherein the query data point q represents attributes of a user that accessed a website over a network using a remote computing device;
access and select an arbiter point to perform classification of the query data point q;
access a first set of classified data points belonging to a first known classification, wherein the first set of classified data points is based upon first responses to a first type of content by users associated with the first known classification;
for the first set of classified data points:
for one or more data points in the first set,
selecting a classified data point $x_c$ from the first set belonging to the first known classification to form a data point pair (q, $x_c$) with the query data point q;
calculating a tripoint arbitration coefficient for the data point pair based, at least in part, on a first distance between the query data point q and the classified data point $x_c$, a second distance between the query data point q and the arbiter point, and a third distance between the classified data point $x_c$ and the arbiter point; and
determining a first class-aggregated similarity metric for the query data point q with respect to the first known classification of the first set based, at least in part, on the tripoint arbitration coefficients for data point pairs that include the query data point q and the classified data point $x_c$ in the first set, as calculated using the arbiter point; and
repeating the selecting, the calculating, and the determining for the query data point q using one or more data points in a second set of classified data points belonging to a second known classification to determine a second class-aggregated similarity metric for the query data point q as being similar to the second known classification, wherein the second set of classified data points is based upon second responses to the first type of content by users associated with the second known classification;
classifying the user based on at least the query data point q as belonging to the first known classification corresponding to the first responses or the second known classification corresponding to the second responses based on a comparison of the first class-aggregated similarity metric and the second class-aggregated similarity metric of the query data point q;
selecting content from a set of content based on whether the user is classified as belonging to the first known classification corresponding to the first responses or the second known classification corresponding to the second responses, wherein the selected content is for rendering by the website; and
transmitting the selected content over the network to the remote computing device to render through the website on a display of the remote computing device.

2. The non-transitory computer-readable medium of claim 1, wherein calculating the tripoint arbitration coefficient as (pTAC) is performed using the formula:

$$\rho TAC(q, x_c \mid a) = \frac{\min\{\rho(q, a), \rho(x_c, a)\} - \rho(q, x_c)}{\max\{\rho(q, x_c), \min\{\rho(q, a), \rho(x_c, a)\}\}}$$

wherein a is the arbiter point.

3. The non-transitory computer-readable medium of claim 1, wherein the instructions for classifying the user cause the selecting content to include selecting content determined to be effective for other users classified in the same known classification as the user.

4. The non-transitory computer-readable medium of claim 1, further comprising instructions that when executed by the processor cause the processor to:
  access a set of arbiter points $\{a_0, \ldots, a_n\}$ to perform the classification of the data point q;
  for each arbiter point, determine a class-aggregated similarity metric for the set of arbiter points with respect to a given arbiter point;
  aggregate class-aggregated similarity metrics for the first set among the arbiter points to produce a first arbiter-class-aggregated similarity metric;
  aggregate class-aggregated similarity metrics for the second set among the arbiter points to produce a second arbiter-class-aggregated similarity metric; and
  classify the query data point q based on a comparison of the first class-aggregated similarity metric and the second class-aggregated similarity metric.

5. The non-transitory computer-readable medium of claim 4, wherein the instructions further comprise instructions that when executed by the processor cause the processor to select, as the set of arbiter points, one or more data points from the first set of classified data points or from the second set of classified data points.

6. The non-transitory computer-readable medium of claim 4, wherein the instructions further comprise instructions that when executed by the processor cause the processor to select, as the set of arbiter points, one or more data points not belonging to the first set of classified data points or the second set of classified data points.

7. The non-transitory computer-readable medium of claim 4, wherein the instructions further comprise instructions that when executed by the processor cause the processor to:
  select the set of arbiter points such that each arbiter point in the set is substantially equidistant with respect to the first set and the second set;
  wherein an arbiter point is substantially equidistant with respect to the first set and second set when an aggregated similarity metric determined between the arbiter point and the data points in the first set is substantially equal to an aggregated similarity metric determined between the arbiter point and the data points in the second set.

8. The non-transitory computer-readable medium of claim 4, wherein the instructions further comprise instructions that when executed by the processor cause the processor to select, as the set of arbiter points, one or more data points lying on a predetermined arbiter line segment.

9. The non-transitory computer-readable medium of claim 1, wherein the first responses are indicative of a response to the first type of content and the second responses are indicative of no response to the first type of content.

10. A computing system, comprising:
  at least one processor;
  a module stored on a non-transitory computer readable medium including instructions that when executed by the at least one processor cause the at least one processor to:
    receive a query data point q for classification, wherein the query data point q represents attributes of a user that has accessed a website over a network using a remote computing device;
    select an arbiter point to perform classification of the query data point q;
    access a first set of classified data points belonging to a first known classification, wherein the first set of classified data points is based upon first responses to a first type of content by users associated with the first known classification;
    for the first set of classified data points:
      for one or more data points in the first set,
        select a classified data point $x_c$ from the first set belonging to the first known classification to form a data point pair $(q, x_c)$ with the query data point q;
        calculate a tripoint arbitration coefficient for the data point pair based, at least in part, on a first distance between the query data point q and the classified data point $x_c$, a second distance between the query data point q and the arbiter point, and a third distance between the classified data point $x_c$ and the arbiter point; and
      determine a first class-aggregated similarity metric for the query data point q with respect to the first known classification of the first set based, at least in part, on the tripoint arbitration coefficients for data point pairs that include the query data point q and the classified data point $x_c$ in the first set, as calculated using the arbiter point; and
    repeating the selecting, the calculating, and the determining for the query data point q using one or more data points in a second set of classified data points belonging to a second known classification to determine a second class-aggregated similarity metric for the query data point q as being similar to the second known classification, wherein the second set of classified data points is based upon second responses to the first type of content by users associated with the second known classification;
    classify the user based on at least the query data point q as belonging to the first known classification corresponding to the first responses or the second known classification corresponding to the second responses based on a comparison of the first class-aggregated similarity metric and the second class-aggregated similarity metric of the query data point q;
    select content from a set of content based on whether the user is classified as belonging to the first known classification corresponding to the first responses or the second known classification corresponding to the second responses, wherein the selected content is for rendering by the website; and
    transmit the selected content over the network to the remote computing device to render through the website on a display of the remote computing device.

11. The computing system of claim 10, wherein the module is configured to calculate the tripoint arbitration coefficient (pTAC) using the formula:

$$\rho TAC(q, x_c \mid a) = \frac{\min\{\rho(q, a), \rho(x_c, a)\} - \rho(q, x_c)}{\max\{\rho(q, x_c), \min\{\rho(q, a), \rho(x_c, a)\}\}}$$

wherein a is the arbiter point.

12. The computing system of claim 10, wherein the module is configured to classify the query data point q as belonging to the class associated with the set having a greater class-aggregated similarity metric.

13. The computing system of claim 10, wherein the module is configured to access a set of arbiter points {$a_0$, ..., $a_n$} to perform classification of the data point q;

for each arbiter point, determining a class-aggregated similarity metric for the set with respect to a given arbiter point;

aggregating class-aggregated similarity metrics for the first set among the arbiter points to produce a first arbiter-class-aggregated similarity metric;

aggregating class-aggregated similarity metrics for the second set among the arbiter points to produce a second arbiter-class-aggregated similarity metric; and classifying the query data point q based on a comparison of the first class-aggregated similarity metric and the second class-aggregated similarity metric.

14. The computing system of claim 10, wherein the set of arbiter points comprises one or more data points from the first set of classified data points or the second set of classified data points.

15. The computing system of claim 10, wherein the set of arbiter points comprises one or more data points not belonging to the first set of classified data points or the second set of classified data points.

16. A computer implemented method performed by a computing device including at least one processor and a memory, the method comprising:

receiving, by at least the processor, a query data point q for classification, wherein the query data point q represents attributes of a user that accessed a website over a network using a remote computing device;

accessing, by at least the processor, a set of arbiter points A to perform classification of the query data point q;

accessing, by at least the processor, a first set of classified data points belonging to a first known classification and a second set of classified data points belonging to a second known classification, wherein the first set of classified data points is based upon first responses to a first type of content by users associated with the first known classification, wherein the second set of classified data points is based upon second responses to the first type of content by users associated with the second known classification;

determining, by at least the processor, a set of respective first class-aggregated similarity metrics for the query data point q and the first set based, at least in part, on tripoint arbitration coefficients for data point pairs that include the query data point q and a classified data point $x_c$ in the first set of the first known classification, as calculated using corresponding arbiter points in the set of arbiter points A, wherein a tripoint arbitration coefficient is calculated based at least in part on a first distance between the query data point q and the classified data point $x_c$, a second distance between the query data point q and an arbiter point, and a third distance between the classified data point $x_c$ and the arbiter point;

aggregating, by at least the processor, the set of first class-aggregated similarity metrics to determine a first arbiter-class-aggregated similarity metric of how similar the query data point q is to the first known classification;

determining, by at least the processor, a set of respective second class-aggregated similarity metrics for the query data point q and the second set from the second known classification based, at least in part, on tripoint arbitration coefficients for data point pairs that include the query data point q and an unclassified data point in the second set, as calculated using corresponding arbiter points in the set of arbiter points A;

aggregating, by at least the processor, the set of second class-aggregated similarity metrics to determine a second arbiter-class-aggregated similarity metric of how similar the query data point q is to the second known classification;

classifying, by at least the processor, the user based on at least the query data point q as belonging to the first known classification corresponding to the first responses or the second known classification corresponding to the second responses based on a comparison of the first arbiter-class-aggregated similarity metric to the second arbiter-class-aggregated similarity metric of the query data point q;

selecting, by at least the processor, content from a set of content based on whether the user is classified as belonging to the first known classification corresponding to the first responses or the second known classification corresponding to the second responses, wherein the selected content is for rendering by the website; and transmitting, by at least the processor, the selected content over the network to the remote computing device to render through the website on a display of the remote computing device.

17. The method of claim 16, wherein the method comprises classifying, by at least the processor, the query data point q as belonging to the class associated with the set having a greater arbiter-class-aggregated similarity metric.

18. The method of claim 16, wherein the set of arbiter points comprises a single arbiter point that is selected randomly from the first set and the second set.

19. The method of claim 16, wherein the set of arbiter points is selected such that each arbiter point in the set is substantially equidistant with respect to the first set and the second set, further wherein an arbiter point is substantially equidistant with respect to the first set and second set when an aggregated similarity metric determined between the arbiter and data points in the first set is substantially equal to an aggregated similarity metric determined between the arbiter and data points in the second set.

20. The method of claim 16, wherein the method further comprises classifying the query data point q as not belonging to either the first known classification or the second known classification when both the first arbiter-class-aggregated similarity metric and the second arbiter-class-aggregated similarity metric are below a threshold.

* * * * *

UNITED STATES PATENT AND TRADEMARK OFFICE
CERTIFICATE OF CORRECTION

PATENT NO. : 10,163,034 B2
APPLICATION NO. : 13/969771
DATED : December 25, 2018
INVENTOR(S) : Urmanov et al.

Page 1 of 1

It is certified that error appears in the above-identified patent and that said Letters Patent is hereby corrected as shown below:

In the Specification

In Column 5, Line 12, delete "(denoted" and insert -- denoted --, therefor.

In Column 13, Line 46, delete "(2d." and insert -- (2nd. --, therefor.

In the Claims

In Column 14, Line 55, in Claim 2, delete "(pTAC)" and insert -- (ρTAC) --, therefor.

In Column 16, Line 55, in Claim 11, delete "(pTAC)" and insert -- (ρTAC) --, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*